Patented Nov. 21, 1922.

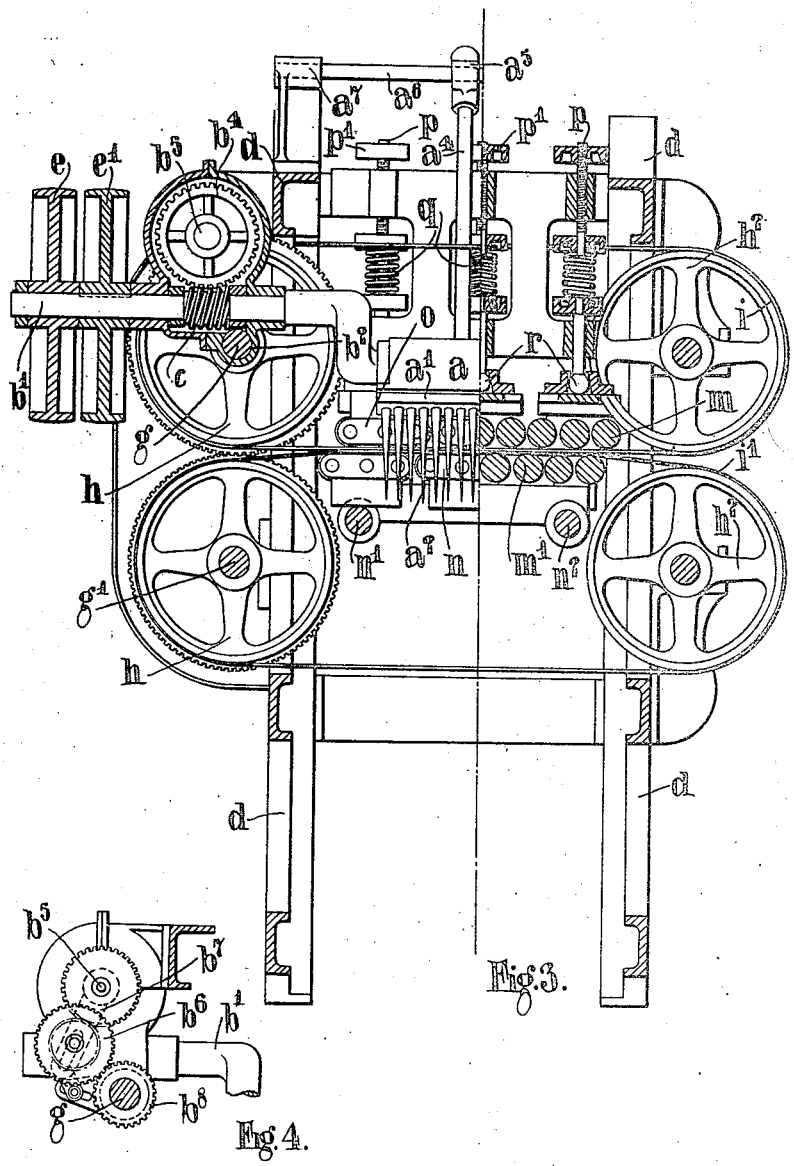

1,436,185

UNITED STATES PATENT OFFICE.

GEORGES MICHOT, OF DROMARA, IRELAND, ASSIGNOR TO FIBRE CORPORATION LIMITED, OF LONDON, ENGLAND.

MACHINE FOR DESEEDING FLAX.

Application filed May 6, 1920. Serial No. 379,410.

*To all whom it may concern:*

Be it known that I, GEORGES MICHOT, a citizen of the Swiss Republic, residing at Dromara, county Down, Ireland, have invented certain new and useful Improvements in Machines for Deseeding Flax, of which the following is a specification.

This invention relates to machines for deseeding flax of the power driven type adapted to separate the seed vessels from the stalks of flax in an effectual and speedy manner, while avoiding damage to the seed or straw.

The object of the invention is to provide an improved form of deseeding machine.

The invention consists in employing feeding appliances adapted to grip and carry forward the flax straw with the seed ends projecting, together with a comb actuated by suitable mechanism to enter the flax close to the gripping means, and then to move away therefrom, thus stripping off the seed bolls, and return clear of the flax towards the gripping means.

The invention also consists in a machine comprising feed bands adapted to grip and feed the flax straw, the feed bands being held in contact with one another upon the straw by means of spring pressed rollers.

The bands and their gripping rollers are so arranged that the straw when gripped and fed, lies across the bands and has the seed ends projecting into the path of a comb carried pivotally on a crank pin. The path of motion and the direction of the comb is further controlled as by a rod in fixed relationship to the comb sliding through a sleeve pivoted on a fixed part of the machine. The speed of rotation of the crank shaft and the rate at which the flax is fed by the feeding and gripping rollers are such that each complete excursion of the comb is accompanied by an appropriate amount of lateral traverse of the straw which is being deseeded.

The accompanying drawings and description illustrate and make clear my invention in which:—

Figure 3 is a part sectional end elevation of the machine on the line 3—3 of Figure 2, and Figure 4 is a face view of the intermediate gear for driving the first motion shaft of the feed mechanism.

Figure 1:
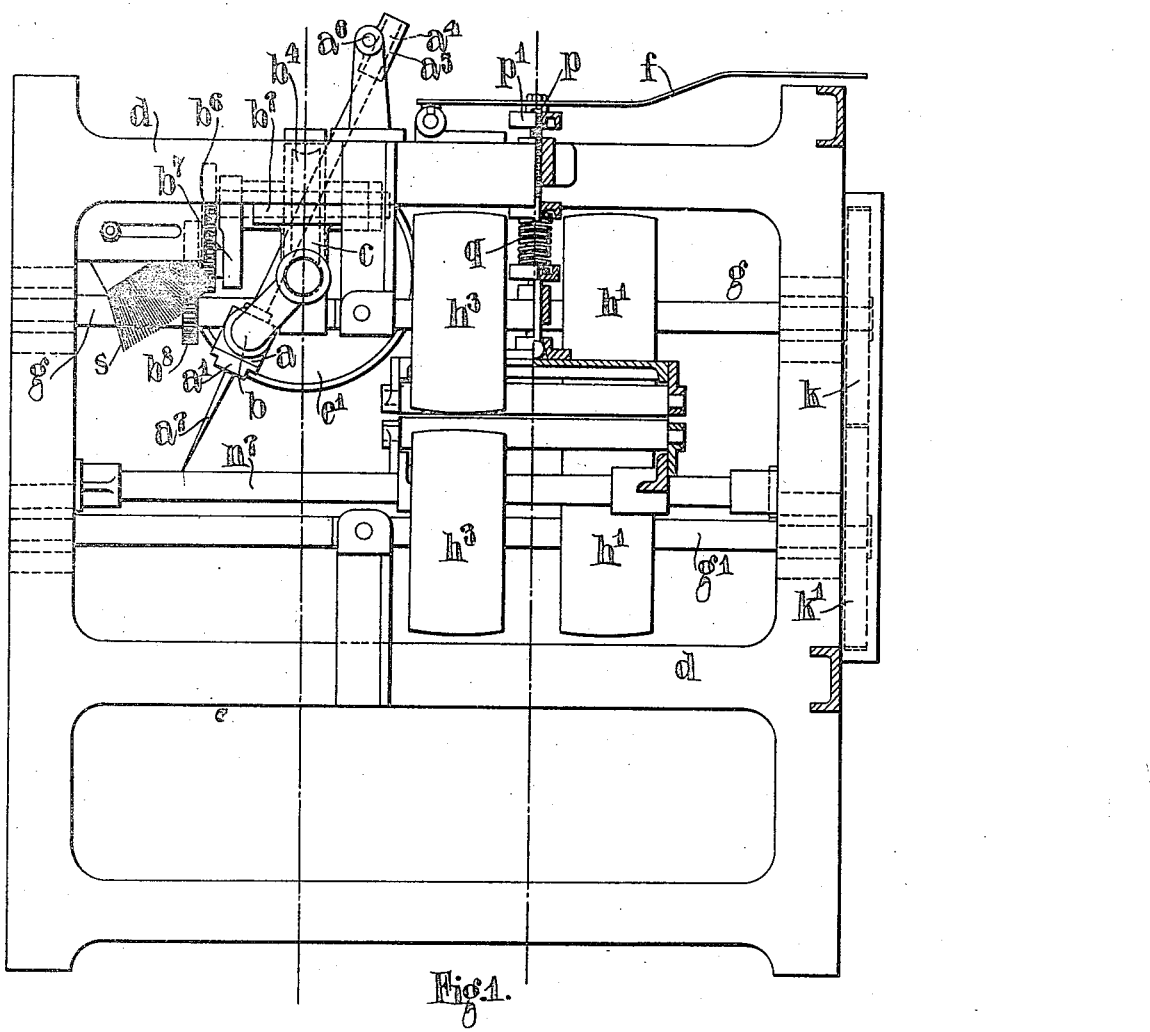
Figure 1 shows a side elevation of the complete machine, a part of the housing of the feed rolls and spring adjustment being in section.
Figure 2:
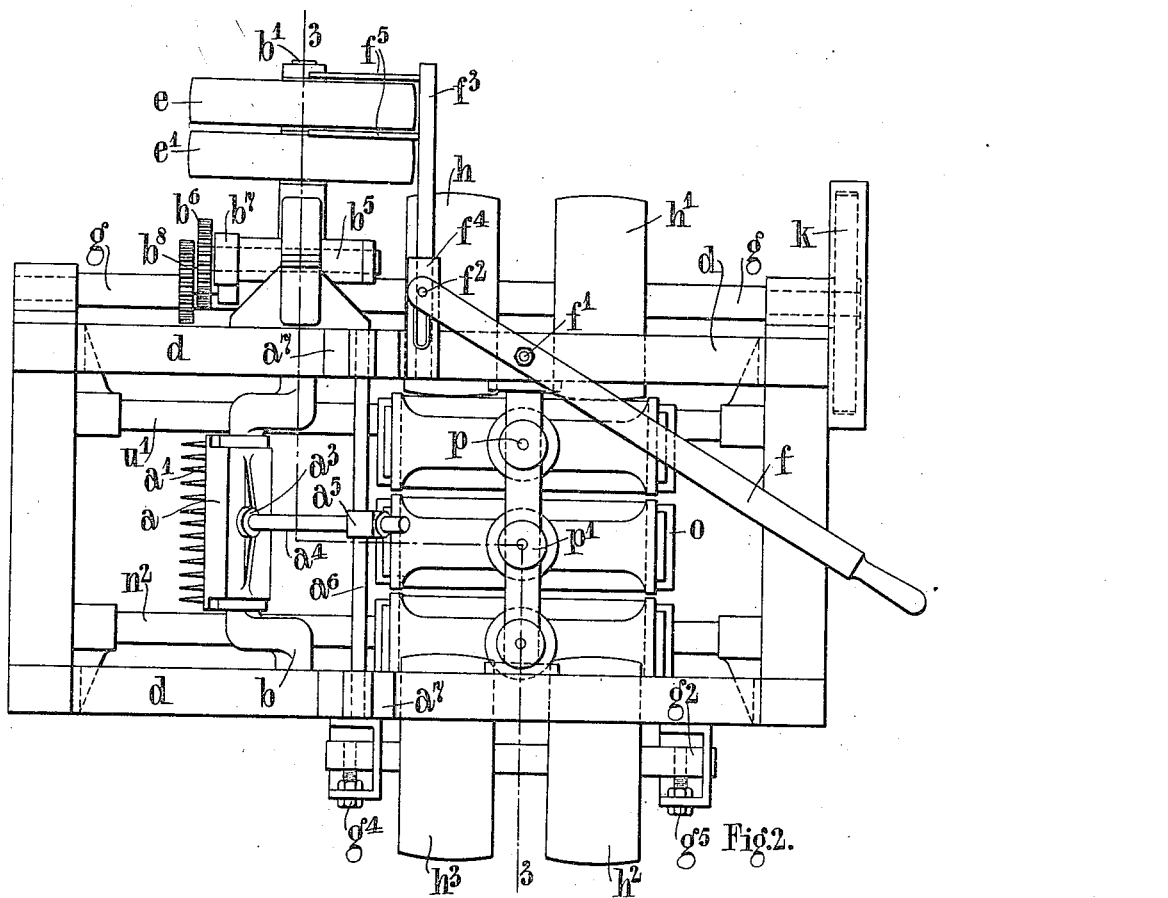
Figure 2 is a plan view of the machine with the brush removed.

In carrying the invention into effect in one form a single comb is mounted upon a crank pin $b$ forming part of a crank shaft $b^1$ running in suitable bearings secured to the upper part of the side frames $d$ $d$ of the machine, the shaft $b^1$ being extended as shown for the reception of the fast and loose driving pulleys $e$, $e^1$ to receive the driving belt which may be shifted in a manner well known by means of a suitable hand lever $f$.

On the extension $b^1$ of the crank shaft, a worm $b^3$ is provided to engage with the worm wheel $b^4$ mounted upon the horizontal counter-shaft $b^5$. The drive from the shaft $b^5$ to the upper feed wheel shaft $g$ is effected by detachable change gear wheels $b^6$, $b^8$, of the well known type as used in lathes, (see Figure 4) the gear wheel $b^6$ being mounted on a stud adjustable along the adjustable arm $b^7$. A positive feed motion is thus transmitted to the pairs of feed wheels $h$, $h^1$, $h^2$ and $h^3$ and the endless pairs of bands $i$ $i^1$ mounted thereon, the upper and lower set of feed wheels being connected by equal diameter toothed gear wheels $k$ $k^1$ in a casing at the rear end of the machine. The feed wheels are mounted on the shafts $g$ $g^1$ and carry the endless feed bands $i$ $i^1$, the opposite side of the machine having similar wheels $h^2$ $h^3$ for supporting the feed bands as shown. This set of wheels $h^2$ and $h^3$ are supported in adjustable bearings upon the axial shafts $g^2$ in which set screws $g^4$, $g^5$ are provided for tightening the feed bands to the required tension for conveying the flax straw to the operating point for de-seeding by the rotating comb.

The conveyor feed bands $i$ mounted on the feed wheels $h$, $h^1$, $h^2$ and $h^3$ pass between an upper and lower set of closely arranged rollers $m$, $m^1$ the lower set being supported by a frame $n$ carried by bearing bars $n^1$, $n^2$ securely attached at each end to the frame of the machine. The upper set of rollers $m$ are secured in bearing pieces $o$ which are pressed in a downward direction by means of the screws $p$ having intervening springs $q$ for varying the degree of pressure by means of the hand wheels $p^1$ on the feed bands to suit the particular requirements of the flax straw which is undergoing treatment. A ball joint connection is provided at $r$ where the connection is made between the bearing pieces $o$ and the screws $p$, to enable the rollers to adapt themselves to meet any variation in the thickness of the straw between the feed bands.

The comb which is mounted upon the crank pin $b$ consists of a bearing piece centrally divided, the lower part $a$ having a number of taper rods or pins $a^2$ rigidly secured therein; the upper part $a$ has a central boss $a^3$ in which a rod $a^4$ is firmly secured. This rod $a^4$ extends to the upper part of the machine and reciprocates in a pivoted sleeve bearing $a^5$ which is free to oscillate on a horizontal axle $a^6$ supported in the standards $a^7$ secured to the top member of the side frames $d, d$.

A brush $s$ with stiff fibres may be firmly secured by means of suitable angle irons and adjusting plates between the side frames of the machine in a position as shown in Figure 1 of the drawings to contact with the comb after each excursion with the seed bolls of the flax straw secured between the feed bands.

When the machine is in operation a table (not shown) of suitable height and width is placed on the feeding side thereof in line with the feed bands, upon which the flax straw is laid by the attendant operator at right angles thereto, with the seed bolls placed against a projection on the table, such projection forming a stop or guide to maintain the straw in the correct position for delivery to the feed belts for engagement with the comb in its path of travel.

The straw after the de-seeding operation is then delivered into a trough on the opposite side of the machine from which it is removed in a quantity sufficient to form a bundle and is subsequently stored for further operation.

By means of the construction adopted it is possible for the comb to enter the straw gripped between the feed belts close to the seed bolls thereby saving a considerable amount of space over the method previously used. A further advantage is gained owing to the fact that shorter straw can be more effectually gripped by the feed belts, and is thus prevented from "flying out" when subjected to the action of the comb. There is also less friction, owing to fewer bearings and gearing being employed.

The construction of this machine enables a much higher rate of speed to be used, and consequently an increased output with better results is obtained.

Having now particularly described and ascertained the nature of my said invention and in what manner the same is to be performed, I declare that what I claim is:—

A machine for de-seeding flax, straw and the like comprising means for gripping substantially the entire length of the stalks and conveying the same with the seed boll ends free, a transversely operating comb having cone-shaped teeth, the bases of which are arranged in close proximity to one another, said teeth being adapted to enter the heads of the stalks, move along the stalks away from the stripping means and then return clear of the flax to the gripping means, and means for actuating said comb.

In testimony whereof I have signed my name to this specification.

G. MICHOT.

Witnesses:
 JOHN McLUNDE,
 MARGARET MUVNIN.